Dec. 22, 1953   D. W. McARTHUR   2,663,514
CUTTER FOR FILM TAKE-UP MAGAZINES
Filed Sept. 29, 1950   2 Sheets-Sheet 1
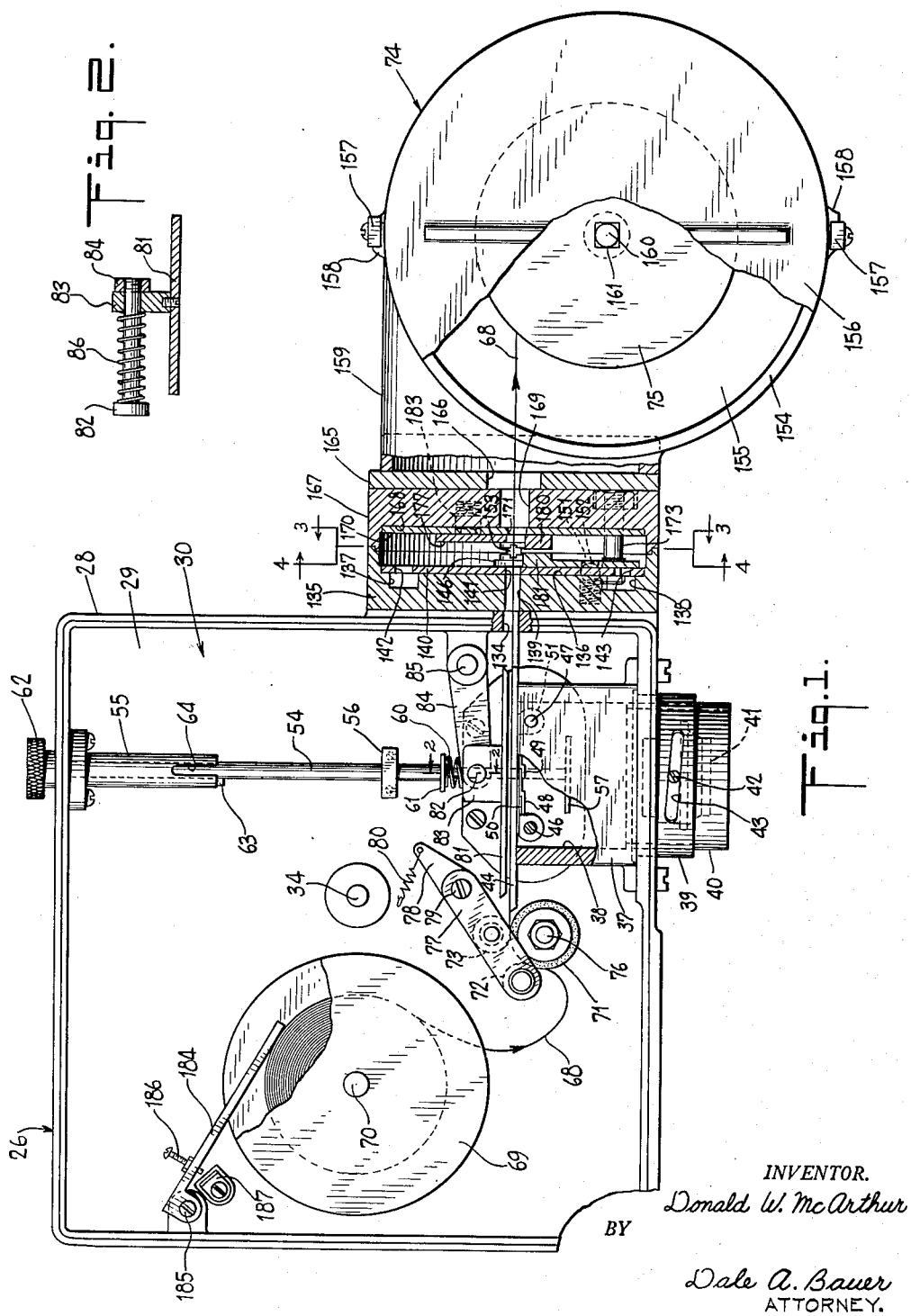
INVENTOR.
Donald W. McArthur
BY
Dale A. Bauer
ATTORNEY.

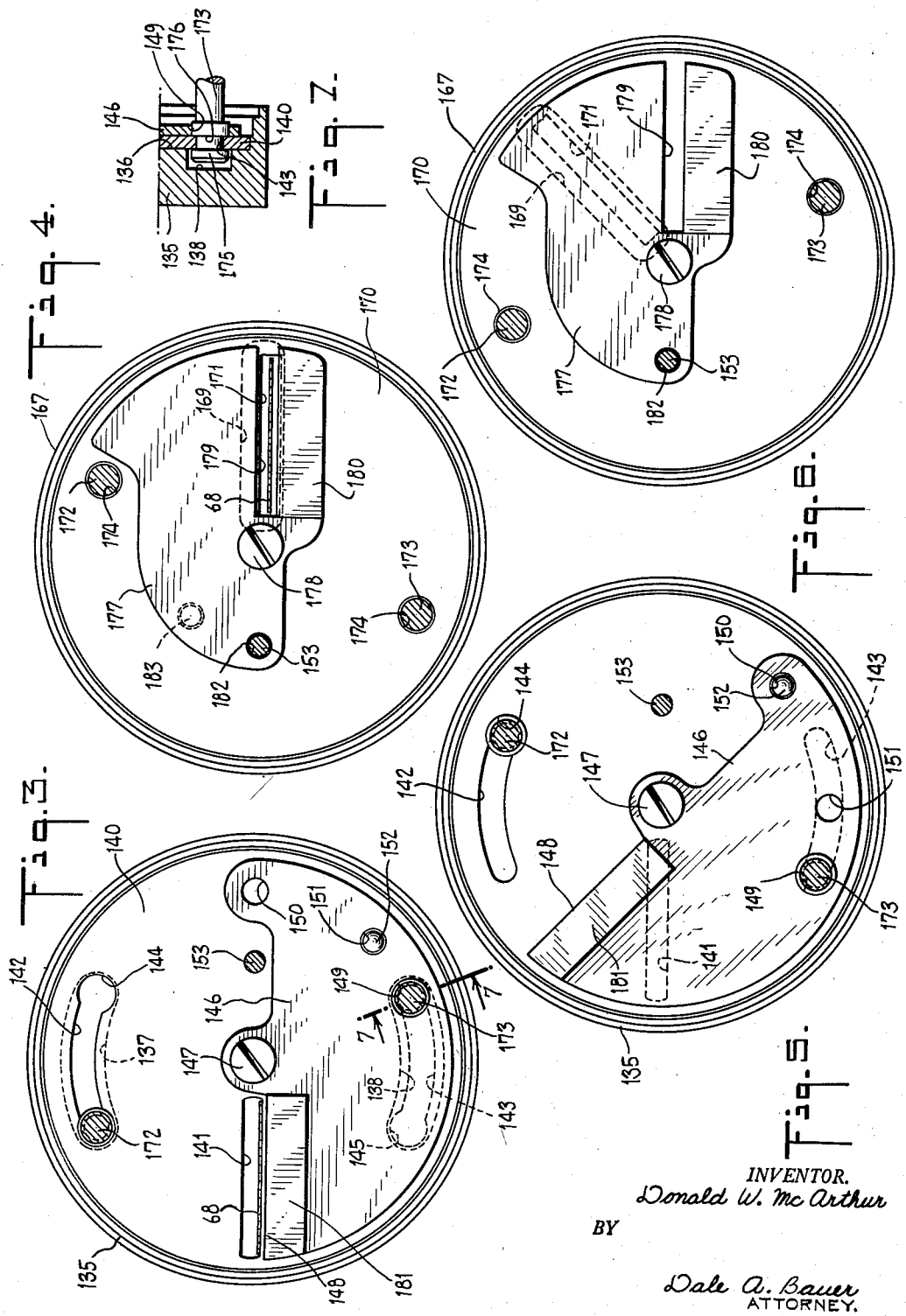

Patented Dec. 22, 1953

2,663,514

UNITED STATES PATENT OFFICE 2,663,514

CUTTER FOR FILM TAKE-UP MAGAZINES

Donald Wesley McArthur, Salt Lake City, Utah, assignor to Filmsort Inc., a corporation of Delaware Application September 29, 1950, Serial No. 187,516

10 Claims. (Cl. 242—71)

This invention relates to photographic apparatus and more particularly to roll film cameras which are especially adapted for photographing documents, letters, drawings, etc., on microfilm.

One of the objects of the present invention is to provide a novel, simple and effective camera structure for photographing documents of different sizes on a film strip of uniform width.

Another object of the invention is to provide a novel camera of the type defined which is capable of selectively photographing documents of different sizes such that the images of said documents will be closely spaced on the film to eliminate waste of film.

Another object is to provide a camera structure wherein the exposed portion of a film strip may, through the provision of novel cutting means and light-sealing means, be severed at any desired time from the unused portion of said film strip and removed from the camera for developing purposes.

Still another object is to provide a camera having a removable take-up magazine for the exposed portion of a film strip, said camera and said magazine having registerable openings in opposed walls thereof for the passage of the exposed film strip therethrough into the magazine, and also including novel cutting members effective to light-seal said openings and sever the exposed portion of the film strip from the unused portion thereof upon removal of said magazine from said camera.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts througout the several views, Fig. 1 is an enlarged front elevational view of a camera and film take-up magazine with the front cover plate of said camera removed and portions of the camera and magazine casings broken away for purposes of clearer illustration, and showing in section film severing means constructed in accordance with the present invention and disposed between said camera and magazine and forming a part thereof;

Fig. 2 is an enlarged fragmentary vertical sectional view on the line 2—2 of Fig. 1;

Fig. 3 is an end elevational view of the film severing means on the camera as viewed from the position indicated by the line 3—3 of Fig. 1 and looking in the direction of the arrows;

Fig. 4 is an end elevational view of the film severing means on the take-up magazine as viewed from the position indicated by the line 4—4 of Fig. 3 and looking in the direction of the arrows;

Figs. 5 and 6 are views similar to Figs. 3 and 4, respectively, but showing the film severing means in the positions they occupy when the magazine is rotated relative to the camera preparatory to the removal therefrom; and Fig. 7 is fragmentary vertical sectional view on the line 7—7 of Fig. 3.

Referring to the drawings, wherein there is shown by way of example, one form of photographic apparatus embodying the present invention, 26 indicates generally a camera which is preferably adapted for photographing documents, letters, books or other copy on roll film. As shown, the camera 26 comprises a rectangular casing 28 which is open at both ends thereof and is provided intermediate said ends with a wall 29 which divides said casing into a front compartment 30 and a rear compartment (not shown). The front compartment 30 is normally closed in light-tight relation by a cover plate (not shown) which is removably secured to the front edge of the casing 28 by a suitable thumb screw (not shown) which projects through a suitable opening in said cover plate and is threaded into a suitable threaded opening 34 formed in the dividing wall 29.

Disposed within the front compartment 30 and bolted or otherwise suitably secured to the bottom wall of the casing 28 adjacent the right-hand end thereof, is an exposure housing 37 provided centrally thereof with a rectangular-shaped bore 38 extending vertically therethrough. Clamped between the housing 37 and the bottom wall of the casing 28 in coaxial relation with the bore 38 in said housing is a flanged cylindrical shell 39 which projects downwardly beyond said housing and said wall through a suitable opening in the latter. Slidably fitted for relative telescopic movement within the shell 39 is an adapter 40 within which is suitably secured an objective 41. Secured in the wall of the adapter 40 is a pin 42 which projects radially therefrom into an inclined cam slot or groove 43 formed in the wall of the shell 39, said pin and slot arrangement providing for adjustment of the objective 41 toward and away from the casing 28 to properly focus said objective with respect to the copy to be photographed which rests on a suitable support spaced below the camera 26.

Bolted or otherwise suitably secured to the upper surface of the exposure housing 37 is a film supporting and guiding plate 44 formed with a rectangular-shaped exposure aperture (not shown) which is located centrally with respect to the optical axis of the objective 41 and the axis of the bore 38 in said housing, the upper flat surface of said plate forming the focal plane for said objective. Journalled in suitable bearings in the housing 37 and extending at right angles to the direction of movement of the film strip over the guide plate 44 are two parallel shafts 46 and 47 which are equally spaced at opposite sides of the axis of the bore 38 in said housing and are located beyond the ends of the exposure aperture and out of the optical path of the objective 41. Disposed within the bore 38 of housing 37 and suitably secured to the shafts 46 and 47 for pivotal movement thereby toward and away from the guide plate 44 are two cooperating shutter flaps 48 and 49. The shutter flap 49 is secured to shaft 47 and is made longer than the shutter flap 48 which is secured to shaft 46 so that when both said flaps are swung in unison toward each other and toward the guide plate 44, as hereinafter described, to their normal positions shown in Fig. 1, flap 49 will underlap flap 48 and thus completely cover the exposure aperture and prevent exposure of the film overlying said aperture and said plate. When the flaps 48 and 49 are swung in unison away from each other and the guide plate 44 completely out of the optical path of the objective 41, the exposure aperture will be substantially fully uncovered for a predetermined interval, resulting in exposure of substantially the entire area of the film within said aperture to receive an image of the document or other copy, said exposure being referred to as a full size exposure or a full frame exposure. The free underlapping end of the longer shutter flap 49 is offset downwardly the thickness of the shorter shutter flap 48 so that both of said flaps will lie in a single plane and parallel with the guide plate 44 when in overlapping position and the exposure aperture is completely covered thereby, as above described.

Loosely mounted on the shafts 46 and 47 and overlapping and straddling the shutter flaps 48 and 49 on said shafts are two cooperating auxiliary flaps 50, one only being shown, and these auxiliary flaps are of equal length, but are made shorter than the shutter flaps 48 and 49 an amount such that when said auxiliary flaps are disposed in parallel relation with the guide plate 44, one-quarter of the exposure aperture at each end thereof will be covered or masked by said auxiliary flaps, while the remaining central one-half of said aperture will not be covered by said flaps. The portions of the shutter flaps 48, 49 not overlapped by the auxiliary flap 50 are preferably, but not necessarily, offset upwardly the thickness of said auxiliary flaps so that said portions will lie in the same plane as the auxiliary flaps and form in effect a continuation thereof to further insure complete closure of the exposure aperture. The auxiliary flap 50 is, through the medium of suitable yieldable connections such as torsion springs (not shown), connected with the shafts 46 and 47 for movement thereby away from the guide plate 44, and to permit rotary movement of said shafts relative thereto, said springs being engaged over the shafts and each having one end thereof anchored to its respective shaft and the opposite end engaged with its respective flap.

It will thus be apparent that with the construction thus far described, when the shutter flaps 48, 49 are swung away from the guide plate 44 by the shafts 46, 47, the auxiliary flap 50 is also moved with said shutter flaps away from said plate by said shafts through the torsion springs so that the exposure aperture is fully uncovered for the making of a full size exposure on the film, as hereinbefore described. When the shutter flaps 48, 49 are returned by the shafts 46, 47 to their original positions after the making of a full size exposure on the film, the auxiliary flap 50 is likewise returned with and by said shutter flaps. It will also be apparent, however, that when the auxiliary flap 50 is held, by means to be presently described, in the position shown in Fig. 1 and against movement with the shutter flaps 48, 49 away from the guide plate 44 in effecting an exposure on the film, one-half of the exposure aperture will remain covered by said auxiliary flaps, thus reducing said exposure aperture to one half of its normal effective length and masking substantially one-half of the area of the film which would otherwise be exposed. Accordingly, only that reduced area of the film confined by the opposed edges of the auxiliary flap 50 and uncovered by the central one-half of the exposure aperture will be exposed to receive thereon the image of the document or other copy when the shutter flaps 48, 49 are actuated, said reduced exposure being referred to as a one-half size exposure or a one-half frame exposure. The auxiliary flap 50 is employed when photographing small copy sheets within the limits of the reduced film area afforded by said flaps, thus conserving film and provide for a greater number of exposures on a given length of film.

Means under the control of the operator are provided for holding the auxiliary flap 50 in the position shown in Fig. 1 when making one-half size exposures on the film, and for permitting movement of said flap with the shutter flaps 48, 49 when making full size exposures on said film. As shown said auxiliary-flap-holding means comprises a vertically extending rod 54 disposed within the front compartment 30 and guided for axial sliding movement in a sleeve 55 and a block 56 which are also disposed within said compartment. The sleeve 55 is suitably secured to the top wall of the casing 28, and the block 56 is suitably secured to the dividing wall 29 of said casing. The lower end of the rod 54 projects into the bore 38 in the exposure housing 37 through a suitable opening provided in the film guide plate 44. The rod 54 is located rearwardly beyond the path of movement of the film over the guide plate 44 and beyond the optical path of the objective 41.

Rotatably carried by the rod 54 at the lower end thereof is a horizontal control plate 57 extending lengthwise of the housing 37 and disposed below tabs formed on and extending rearwardly from the auxiliary flap 50. The plate 57 is prevented by the housing 37 from rotating with the rod 54 and relative to said housing. The plate 57 is yieldingly urged upwardly into engagement with the tabs of the auxiliary flap 50 to hold the auxiliary flaps in operative position, by a compression coil spring 60 surrounding the rod 54 and having one end thereof engaging against the film guide plate 44 and the opposite end engaging against a washer 61 which, in turn, engages an annular shoulder on said rod.

When making a full size exposure on the film, the rod 54 is moved downwardly by the operator to release the auxiliary flap 50 by the plate 57 and bring the latter to the position shown in Fig. 1 beyond the path of pivotal movement of said flaps. For this purpose, the rod 54 projects beyond the top of the casing 28 and is provided at its upper end with a manipulating knob 62. The rod 54 is provided with a radially projecting pin 63, and the sleeve 55 is provided with an axially extending slot 64 opening outwardly through the lower end thereof. The pin 63 is adapted to enter the slot 64 when the rod 54 is raised by spring 60 to its uppermost auxiliary flap-holding position, and is adapted to move out of said slot and into engagement with the lower edge of said sleeve when said rod is lowered to its lowermost auxiliary-flap-releasing position and is then rotated by the operator a few degrees in either direction. Engagement of the pin 63 with the lower edge of the sleeve 55 holds the rod 54 and plate 57 thereon in their lowermost auxiliary-flap-releasing positions while full size exposures are being made on the film. When half size exposures are to be made on the film, the operator turns the rod 54 until the pin 63 thereon is aligned with the slot 64 in the sleeve 55, whereupon said rod is raised by the expanding action of the spring 60 and the plate 57 is engaged with the tabs on the auxiliary flap 50 to hold the latter in raised operative position, and against downward movement with the shutter flaps 48, 49.

If desired, the control plate 57 for holding the auxiliary flap 50 in raised operative position when making half size exposures on the film, may be electrically operated by a simple substitution of an electromagnetic device in lieu of the long manually operated rod 54, the sleeve 55, and the spring 60.

A supply strip 68 of unexposed film of a suitable size and type well known in the art, such as 35 mm. sensitized cellulose acetate film, is wound on a reel 69 with the emulsion or sensitized side of said film facing the center of said reel. The reel 69 is disposed within the front compartment 30 and is rotatably mounted on a pin 70 which is suitably secured in the dividing wall 29 adjacent the upper left hand side of said compartment. The strip film 68 is drawn from the top of the reel 69 and threaded over a rubber-covered film-feed roller 71 and between the latter and two pressure rollers 72 and 73 which cooperate with said feed roller and are spaced about the periphery thereof. From the feed and pressure rollers 71 and 72, 73 respectively, the film strip 68 is directed over the guide plate 44, over the exposure aperture, and through the focal plane of the objective 41, and then passes into a light-tight take-up magazine 74, to be hereinafter described, which is removably mounted on the casing 28 at the right hand side thereof, and wherein the exposed portion of said film may be permitted to recoil itself or may be wound on a take-up reel 75, as desired.

The film feed roller 71 is disposed within the front compartment 30 between the reel 69 and the exposure housing 37, and is fixed on a spindle 76 which is journalled in a suitable bearing in the dividing wall 29. The pressure rollers 72, 73 are disposed between and journalled on two interconnected arms 77 and 78 which are pivotally mounted on a pin 79 suitably secured in the dividing wall 29. The pressure rollers 72, 73 are yieldingly urged toward the feed roller 71 and held in engagement with the film strip 68 by suitable resilient means, such as an extension coil spring 80 having one end thereof connected to the dividing wall 29 and the opposite end connected to the arm 78.

Disposed within the front compartment 30 and above the film guide plate 44 is a pressure plate 81 which cooperates with said guide plate to hold the film strip 68 flatwise against the upper surface of the guide plate during each film exposure operation. This pressure plate 81 is mounted for pivotal movement on a headed stud 82 (Figs. 1 and 2) so that it will assume a position parallel with the guide plate 44 to firmly press the portion of the film strip 68 engaged thereby against said guide plate. The stud 82 projects through a suitable clearance opening in a block 83 secured to the pressure plate 81, and is suitably secured in the free end of a horizontal arm 84 which is fixed on one end of a pin 85 that is journalled in a suitable bearing in the dividing wall 29. A compression coil spring 86 surrounding the stud 82 and disposed between the head on said stud and the block 83 on the pressure plate 81 serves to yieldingly press said block against the arm 84 so that a frictional drag will be imposed upon the pressure plate 81 to hold it against relative pivotal movement on the stud 82 and, hence, out of contact with the film strip 68 when said plate is lifted to release said film strip for further movement after an exposure has been made thereon.

Suitable driving means are provided for operating the shutter flaps 48, 49, the feed roller 71, and the pressure plate 81 in proper timed relation with each other during each cycle of operation of the camera, and since said driving means per se forms no part of the present invention it is believed to be unnecessary to illustrate and describe the same. It is pointed out, however, that the driving means is located within the rear compartment of the camera, and that the shutter flaps, feed roller, and pressure plate will be operated by said driving means in the following sequence to effect a single exposure on the film strip 68 of the document or other copy. The pressure plate 81 will be first moved into engagement with the film strip 68 extending over the guide plate 44 and the exposure aperture to firmly press it against the upper surface of said guide plate. Then, the shutter flaps 48, 49 will be moved away from the guide plate 44 to uncover the exposure aperture so that an exposure of the document or other copy will be made on the film strip 68, the auxiliary flap 50 moving with said shutter flaps when the exposure is to be full size and not partaking of such movement when the exposure is to be half-size. Then, the shutter flaps 48, 49 will be returned to their original positions to again cover the exposure aperture. Then, the pressure plate 81 will be moved out of engagement with the film strip 68 and returned to original position to release said film strip for further feeding movement. And, then, the feed roller 71 will be rotated a predetermined extent to feed a predetermined amount of film strip 68 depending on the length of the exposure aperture and the size of the exposure on the film strip controlled by the auxiliary flap 50 so as to bring the exposed portion of the film strip a slight distance beyond the leading edge of the exposure aperture, or the free edge of the auxiliary flap 50 which is carried by the shaft 47 as the case may be, and to bring an unexposed portion of the film strip into exposure position, thus completing one cycle of operation of the camera and restoring the parts to starting position in readiness for the next exposure at which time the above described operations will be repeated.

As the exposures, full size and/or half size, are successively made on the film strip 68 along the length thereof and said film strip is intermittently advanced over the guide plate 44 during successive cycles of operation of the camera 26, the exposed leading portion of the film strip passes straight forward from said camera into the take-up magazine 74 wherein it may be permitted to recoil itself or may be wound on the take-up reel 75, as desired. As will appear hereinafter, the camera 26 and magazine 74 are both provided with novel cutting means for severing the film strip 68 at the exit side of said camera and at the inlet side of said magazine upon removal of the latter from the camera, said cutting means also acting to simultaneously close the film outlet and inlet passages in the camera and magazine, respectively, so that no light will enter the camera and the magazine to fog the film therein. In this manner, the exposed portion of the film strip 68 in the magazine 74 may, at any desired time, be separated from the unused portion of said film strip in the camera 26 and removed from said camera to a dark room for developing purposes.

As shown, the casing 28 of the camera 26 is provided in the wall at the right-hand side thereof with a horizontal transverse film outlet or discharge passage 134 of rectangular formation aligned with the guide plate 44 and into which a narrow portion of said plate extends. Bolted or otherwise suitably secured to the casing wall having the film outlet passage 134 therein and forming a part of said wall exteriorly thereof is an annular block 135. This block 135 is formed at the outer end and for a major portion of the diameter thereof with a recessed face 136 having therein two diametrically opposite arcuate grooves 137 and 138 located adjacent the peripheral edge thereof, and a horizontal transverse film outlet or discharge passage 139 of rectangular formation extending through the block and registering with the film outlet passage 134.

Disposed within the outer end of the block 135 and suitably secured to the face 136 thereof is an annular plate 140 which is provided with a horizontal transverse film outlet or discharge passage 141 of rectangular formation registering with the film outlet passage 139, and with two diametrically opposite arcuate slots 142 and 143 registering with the grooves 137 and 138, respectively. The slots 142, 143 are of a width less than the width of the grooves 137, 138, and terminate at diametrically opposite ends thereof in circular openings 144 and 145, respectively, of a diameter substantially equal to the width of the grooves 137, 138. The plate 140, like the block 135, forms a part of the camera casing 28, and the slots 142, 143 in said plate form in effect undercut grooves in said block. Likewise, the registering passages 134, 139 and 141 in the wall of the casing 28, in the block 135 and in the plate 140, respectively, providing in effect a common film discharge or outlet passage in said casing.

Disposed within the outer end of the block 135 and having sliding contact with the plate 140 is a semi-circular plate-like knife 146 which is mounted centrally of said block for relative pivotal movement on a stud 147 which projects through suitable clearance openings in said knife and said plate and is threaded into a suitable threaded opening in the block 135. The knife 147 is formed with a cutting edge 148 adapted to cooperate with the upper edge of the film outlet passage 141 also formed as a cutting edge in severing the portion of the film strip 68 that has passed from the camera casing 28 beyond the plate 140 and said knife through the passages 134, 139 and 141. The knife 146 is provided, for a purpose to appear hereafter, with a circular opening 149 located adjacent the periphery thereof and registering with the slot 143 in the plate 240, said opening being of a diameter substantially the same as the diameter of the opening 145 at the end of said slot. The knife 146 is further provided adjacent the periphery thereof with two circumferentially spaced smaller openings 150 and 151 which are adapted to receive therein a spring-pressed ball-detent 152 carried by the block 135 and projecting through a suitable clearance opening in the plate 140, said ball-detent being of a larger diameter than the diameter of said openings. The plate 140 has fixed therein a short pin 153 which is transversely aligned with the film outlet passage 141 and is located at the side of the pivotal axis 147 of the knife 146 opposite said passage, said pin projecting from the plate 140 over and beyond the knife 146 for a purpose to appear hereafter.

When the magazine 74 is in proper film receiving position on the camera casing 28, as shown in Fig. 1, the knife 146 is disposed in the position shown in Fig. 3 wherein it will be noted that said knife is completely clear of the film outlet passage 141 and out of the path of advancing movement of the film strip 68, that the cutting edge 148 of the knife is disposed close to and parallel with the passage 141, and that the ball-detent 152 is engaged in the opening 151 in the knife to hold the latter in said position and against accidental displacement. Under these conditions, the film strip 68 may freely pass without obstruction from the camera through the passages 134, 139 and 141, over the knife 146, and into the magazine 74. It will be apparent that when the knife 146 is rotated, however, in a clockwise direction as viewed in Fig. 3, from the position thereof shown in said figure to the position shown in Fig. 5 in a manner and by means to be presently described, the cutting edge 148 of said knife will pass in an arcuate path upwardly and along the upper cutting edge of the passage 141 from the outer end to the inner end of said passage and then beyond the latter, the body of the knife will be disposed over the entire passage 141, and the ball-detent 152 will be engaged in the opening 150 in said knife to hold the latter in actuated position and against accidental displacement. Under these conditions, the portion of the film strip 68 projecting beyond the plate 140 and received in the magazine 74 will be severed at the exit side of the camera by the knife 146 and by a shearing action from the remaining unused portion of said film strip in said camera, and the film passage 141 will be completely closed by said knife in light-tight relation to prevent all light from entering the camera casing 28 through the passages 141, 139, 134 and fogging and damaging the remaining unused portion of the film strip 68 therein.

The film take-up magazine 74 comprises a cylindrical casing 154 disposed at right angles to the camera casing 28 and having a rear wall 155 and a front cover plate 156 removably mounted thereon. The casing 154 is provided at the top and bottom thereof with latches 157 which are suitably secured thereto exteriorly thereof and are adapted to engage ears 158 formed on and projecting from the cover plate 156 for retaining said plate on said casing in light-tight relation. The casing 154 has formed integrally therewith a hollow film-inlet neck portion 159 disposed at right angles thereto and at the left-hand side thereof, as viewed in Fig. 1, said neck portion communicating with the interior of said casing and being open at the outer end thereof, and having its axis disposed above the axis of the casing 154, to facilitate recoiling of the film strip 68 in said casing or winding of said film strip on the take-up reel 75. The casing 154 is provided with a shaft 160 which is journalled in a suitable bearing in the rear wall 155 of said casing, said shaft being formed with a square portion 161 projecting into the casing 154 and on which the reel 75 is non-rotatably mounted.

The reel 75 is rotated by suitable means (not shown) in unison with the rotation of the film feed roller 71 to wind the exposed leading portion of the film strip 68 thereon as said film strip is advanced during successive cycles of operation of the camera. When it is desired to eliminate the take-up reel 75 and permit the film strip 68 to recoil itself in the magazine casing 154, the reel 75 is simply removed from the shaft 160 and from said casing.

Bolted or otherwise suitably secured to the neck portion 159 of the magazine casing 154 at the outer open end thereof is an annular closure or wall plate 165 which is provided with a relatively wide, horizontal transverse film inlet passage 166 (Fig. 1) of rectangular formation registering with the film outlet passage 141 in the plate 140. Bolted or otherwise suitably secured to the outer face of the plate 165 is an annular block 167 (Figs. 1, 4, and 6) which is formed at the outer end and for a major portion of the diameter thereof with a recessed face 168. Formed in the face 168 of block 167 and extending through said block is a horizontal transverse film inlet passage 169 of rectangular formation registering with the film outlet passage 141 in the plate 140 and with the film inlet passage 166 in the plate 165, said inlet passage 169 being of a width less than the width of said inlet passage 166. Disposed within the outer end of the block 167 and suitably secured to the face 168 thereof is an annular plate 170 which is provided with a horizontal transverse film inlet passage 171 of rectangular formation registering with the film outlet passage 141 in plate 140 and with the film inlet passage 169 in block 167, said inlet passage 171 being of a width less than the width of said inlet passage 169 and of the same width as said outlet passage 141. The film strip 68 in passing from the camera 26 into the magazine 74, thus passes through the passages 134, 139, 141, 171, 169 and 166.

Suitably secured in the block 167 are two latch-bolts or pins 172 and 173 which are located diametrically opposite each other and project outwardly from said block through suitable clearance openings 174 in the plate 170. The bolts 172 and 173 are each formed at the outer end thereof with an enlarged head 175 having an annular groove 176 therein (Fig. 7). The bolts 172, 173 cooperate with the plate 140 in the camera block 135 to hold and lock the take-up magazine 74 on the camera 26 in light-tight relation and with the magazine block 167 slightly telescoped into the camera block 135, as shown in Fig. 1, to form a light-tight joint between said blocks. The bolt 173 further serves to actuate the film severing knife 146 on the camera. Accordingly, when the magazine 74 is in proper film receiving position on the camera casing 28, as shown in Fig. 1, the bolts 172, 173 will be disposed at the extreme left and right-hand ends respectively of the arcuate grooves 137 and 138, as shown in Fig. 3, afforded by the arcuate slots 142, 143, the openings 144, 145 at the opposite ends of said slots, and the opening 149 in the knife 146, at which time the outer portions of the heads 175 of bolts 172, 173 will be engaged in the arcuate grooves 137, 138, the plate 140 will be engaged in the annular grooves 176 in said heads, and the inner portion of the head 175 of the bolt 173 will be engaged in the opening 149 in the knife 146, all as shown in Fig. 3 and as shown in Figs. 1 and 7 with respect to the bolt 173. Thus, the magazine 74 is held and locked by the bolts 172, 173 on the camera casing 28 in proper film receiving position with the passages 171, 169 and 166 in said magazine in alignment with the passages 141, 139 and 134 in said casing.

Disposed within the outer end of the magazine block 167 and having sliding contact with the plate 170 is a semi-circular plate-like knife 177 (Figs. 1, 4 and 6) which is pivotally mounted centrally of said block on a stud 178 which projects through suitable clearance openings in said knife and said plate and is threaded into a suitable threaded opening in the block 167. The knife 177 is formed with a cutting edge 179 and with a relatively thick portion 180 spaced below and parallel with said cutting edge. The cutting edge 179 on knife 177 is adapted to cooperate with the lower edge of the film inlet passage 171 in plate 170 also formed as a cutting edge in severing the relatively short portion of the film strip 68 disposed in the space between the blocks 135, 137 from the portion of said film strip that has passed into the magazine casing 154 through the passages 171, 169 and 166. The thick portion 180 of knife 177 is adapted to cooperate with a similar thick portion 181 on the camera knife 146 in bridging the space between the plates 140, 170 and in guiding the leading edge of the film strip 68 into the inlet passage 171 upon initial movement of said film strip into the magazine 74. The knife 177 is provided with a circular opening 182 which is transversely aligned with the pivotal axis 178 of said knife and is located at the side of said axis opposite the cutting edge 179 on the knife. The block 167 is provided with a spring-pressed pin-detent 183 which is yieldingly projected outwardly through the face 168 of said block and through a suitable clearance opening in plate 170 toward the knife 177.

When the magazine 74 is in proper film receiving position on the camera casing 28, as shown in Fig. 1, the knife 177 is disposed in the position shown in Fig. 4 wherein it will be noted that the cutting edge 179 of said knife is disposed slightly above and parallel with the upper edge of the film inlet passage 171 in the plate 170, that the upper surface of the thick portion 180 of the knife is disposed slightly above and parallel with the lower cutting edge of said passage, that the pin 153 on the camera plate 140 is engaged in the opening 182 in the knife 177, and that the detent-pin 183 is engaged with the body of said knife. Under these conditions, the film strip 68 may pass freely without obstruction from the camera 26 into magazine 74, initially and thereafter, through the passages 134, 139, 141, over the knife 146 and the thick portion 181 thereof, under the knife 177 and over the thick portion 180 thereof, and through the passages 171, 169 and 166.

Assuming now that an exposed portion of the film strip 68 has been passed from the camera 26 into the magazine 74, and that it is desirous to immediately develop said exposed film portion. With the magazine 74 in the position shown in Fig. 1, and with the parts of the film severing means in the positions shown in Figs. 3 and 4, the operator grasps the magazine and turns it in a clockwise direction, looking from the right of Fig. 1, until the latch-bolts 172, 173 reach the extreme right and left-hand ends respectively of the arcuate grooves 137, 138 and are alined with the openings 144, 145 at said ends respectively of the arcuate slots 142, 143, as shown in Figs. 5 and 6.

When the magazine 74 is so turned by the operator, the camera knife 146, through engagement of the head 175 of the latch-bolt 173 in the opening 149 in said knife, is rotated by said bolt to the position shown in Fig. 5, thus severing the film strip 68 at the exit side of the camera and closing the film outlet passage 141, as previously described, and the magazine knife 177, through engagement of the fixed pin 153 in the opening 182 in said knife, is held stationary, but the lower cutting edge of the film inlet passage 171 in the magazine plate 170 is moved in an arcuate path upwardly relative to the cutting edge 179 on said stationary magazine knife along said latter edge from the outer end to the inner end thereof and then beyond the same to the position shown in Fig. 6 at which position the body of the stationary magazine knife 177 is disposed over the entire film inlet passage 171, thus severing the portion of the film strip 68 received in the magazine 74 at the inlet side of said magazine and completely closing the inlet passage 171 in light-tight relation to prevent all light from entering the magazine casing 154 through the passages 171, 169, 166 and fogging and damaging the exposed portion of the film strip 68 therein.

The magazine 74 may now be removed from the camera 26 by a straight outward movement thereof and then taken to a dark room for removal of the exposed film portion therefrom for developing purposes. When the magazine 74 is turned to the position shown in Fig. 6, as above described, the detent-pin 183 is positioned in alignment with the opening 182 in the magazine knife 177, and when said magazine is removed from the camera 26, said detent-pin snaps into said opening and thereby holds said magazine knife in passage closing position and against accidental displacement.

When the magazine 74 is replaced on the camera 26 after removal of the exposed portion of the film strip 68 therefrom, the latch-bolts 172, 173 are engaged in the arcuate grooves 137, 138, respectively, through the openings 144, 145 in the plate 140 and the opening 149 in the camera knife 146, and the pin 153 on said plate is engaged in the opening 182 in the magazine knife 177 and moves the detent-pin 183 out of engagement with said opening. The magazine 74 is then turned by the operator in a counter-clockwise direction (Fig. 5) until the latch-bolts 172, 173 reach the extreme opposite ends of the arcuate grooves 137, 138, whereupon said magazine will be held and locked to the camera casing 28, the camera knife 146 will again occupy the position shown in Fig. 3, and the film inlet passage 171 on the magazine will again be aligned with the film outlet passage 141.

The camera 26 is provided with signal means for audibly indicating to the operator that the supply of strip film 68 on the reel 69 is substantially depleted and needs to be replenished. As shown in Fig. 1, said signal means comprises a feeler arm 184 which is pivotally mounted, as at 185, within the front compartment 30 on the dividing wall 29 and rests by gravity on the roll of strip film 68 on the reel 69. Adjustably secured in the arm 184 is a contact member 186 in the form of a machine screw which is adapted to make contact with a contact bracket 187 when the supply of strip film 68 on the reel 69 is substantially depleted, said bracket being disposed below the arm 184 and suitably secured to the dividing wall 29. The arm 184 and bracket 187 are insulated from the wall 29 and are connected in an electric circuit to a bell or buzzer (not shown). Included in the electric circuit to the bell or buzzer is a normally closed manually operable switch (not shown), and a normally extinguished signal light (not shown) under the control of said switch.

When the bell or buzzer is sounded through depletion of the supply of strip film 68 on the reel 69 and resulting engagement of the contact member 186 with the contact bracket 187, the switch is manually operated to open the electric circuit to the bell or buzzer and stop the same, and to close the electric circuit to the signal light to illuminate the same until the camera 26 has been reloaded with a new roll of strip film and said switch has been reset to circuit closing position.

Although only one embodiment of the present invention has been illustrated in the accompanying drawings and described in the foregoing specification, it is to be understood that said invention is not limited to said embodiment. Various changes may be made therein, particularly in the design and arrangement of the parts illustrated, as well as in the mode of operation and manner of use, some of which have been mentioned in the foregoing specification, without departing from the spirit and scope of the invention, as will now be clear to those skilled in the art.

What is claimed is:

1. In a photographic camera, a casing within which exposures may be successively made on and along the length of strip film and having a transversely disposed film discharge passage in a wall thereof, a film take-up magazine mounted on said casing wall for removal therefrom through relative rotation thereof about an axis extending parallel to the direction of movement of the film out of said casing and into said magazine, said magazine having in the opposed wall thereof a transversely disposed film inlet passage registering with said discharge passage, the edge of said discharge passage at one side of the film being formed as a cutting edge, and the edge of said inlet passage at the other side of the film being formed as a cutting edge, a knife plate mounted on said casing wall exteriorly thereof for relative pivotal movement, a knife plate mounted on said magazine wall exteriorly thereof for relative pivotal movement, said knife plates being disposed clear of said discharge and inlet passages to enable the film to pass through the latter into said magazine, and means on said casing wall and said magazine wall and engaging said magazine knife plate and said casing knife plate, respectively, for causing rotation of said casing knife plate over said discharge passage and along the cutting edge thereof and for holding said magazine knife plate stationary when said magazine is rotated in one direction for removal from said casing whereby the film is severed at the discharge and inlet passages and said passages are closed by said knife plates to exclude light from entering said casing and said magazine, said last-named means on said magazine wall also serving to cause rotation of said casing knife plate clear of said discharge passage when said magazine is rotated in the opposite direction and said passages are aligned in the mounting of said magazine on said casing.

2. A photographic camera as defined in claim 1, wherein said knife plate holding and rotating means comprises respectively a pin on said casing wall and engageable in an opening in said magazine knife plate, and a pin on said magazine wall and engageable in an opening in said casing knife plate.

3. A photographic camera as defined in claim 2, wherein said pin on said magazine wall is provided with an annular groove which cooperates with an arcuate undercut groove in said casing wall for locking said magazine in position on said casing when said discharge and inlet passages are in alignment and said knife plates are disposed clear of said passages, and for releasing said magazine for removal from said casing when said knife plates are disposed over said passages and the film has been severed thereby, said groove being enlarged at one end thereof to receive said pin.

4. A photographic camera as defined in claim 3, comprising a spring-pressed detent carried by said magazine wall and engageable in the opening in the magazine knife plate for holding the latter in actuated film severing and passage closing position when the magazine is removed from the casing, and a spring-pressed detent carried by said casing wall and engageable in a separate opening in said casing knife plate for holding the latter in actuating film severing and passage closing when the magazine is removed from the casing.

5. In a photographic camera, a casing within which exposures may be made successively on and along the length of an intermittently advanced strip of film and having a transversely disposed film discharge passage in a wall thereof, said passage having an edge thereof at one side of the film strip formed as a cutting edge, a film take-up magazine mounted on the casing adjacent said wall for removal from said casing through relative rotation thereof about an axis extending parallel to the direction of movement of the film strip out of said casing and into said magazine, said magazine having a transversely disposed film inlet passage in a wall thereof opposed to said casing wall, said inlet passage normally registering with said discharge passage, a knife plate operatively mounted on said casing wall exteriorly thereof and at the side of the film strip opposite the cutting edge of said discharge passage, and means on said magazine wall and operatively connected to said knife plate for moving the latter relative to said casing wall across said discharge passage and the cutting edge thereof when said magazine is rotated relative to the casing in the removal thereof from said casing, whereby the film strip is severed at said discharge passage and the latter passage is closed by said knife plate to exclude light from entering said casing.

6. A photographic camera as defined in claim 5, wherein said knife plate is pivotally mounted on said casing wall, and said knife plate moving means comprises a pin secured in said magazine wall and projecting into a clearance opening in said knife plate.

7. A photographic camera as defined in claim 6, comprising a spring-pressed detent carried by said casing wall and engageable in a separate opening in said knife plate for releasably holding the latter in actuated film-severing and passage-closing position.

8. In a photographic camera, a casing within which exposures may be successively made on and along the length of an intermittently advanced strip of film and having a transversely disposed film discharge passage in a wall thereof, a film take-up magazine mounted on the casing adjacent said wall for removal from said casing through relative rotation thereof about an axis extending parallel to the direction of movement of the film strip out of said casing and into said magazine, said magazine having a transversely disposed film inlet passage in a wall thereof opposed to said casing wall, said inlet passage normally registering with said discharge passage and having an edge thereof at one side of the film strip formed as a cutting edge, a knife plate mounted on said magazine wall for relative movement, said knife plate being located exteriorly of said magazine wall and at the side of the film strip opposite the cutting edge of said inlet passage, and means on said casing wall and engaged with said knife plate for holding the latter against movement with said magazine when the latter is rotated relative to the casing in the removal thereof from said casing, whereby the film strip is severed at said inlet passage and the latter passage is closed by said knife plate to exclude light from entering said magazine.

9. A photographic camera as defined in claim 8, wherein said knife plate is pivotally mounted on said magazine wall, and said knife plate holding means comprises a pin secured in said casing wall and projecting into a clearance opening in said knife plate.

10. A photographic camera as defined in claim 9, comprising a spring-pressed detent carried by said magazine wall and engageable in said clearance opening for holding said knife plate in film passage-closing position when the magazine is removed from the casing, said detent being adapted to be disengaged from said opening by said pin when said magazine is operatively positioned on said casing.

DONALD WESLEY McARTHUR.

References Cited in the file of this patent

UNITED STATES PATENTS

| Number | Name | Date |
|---|---|---|
| 1,344,207 | Miles | June 22, 1920 |
| 1,764,450 | Hindle | June 17, 1930 |
| 2,095,849 | Wittel | Oct. 12, 1937 |
| 2,298,574 | Lockhart | Oct. 13, 1942 |
| 2,492,900 | Swenson | Dec. 27, 1949 |
| 2,496,329 | Briechle et al. | Feb. 7, 1950 |